INVENTOR.
HOWARD F. McCOLLY
JOSEPH MOLITORISZ
BY

ATTORNEY

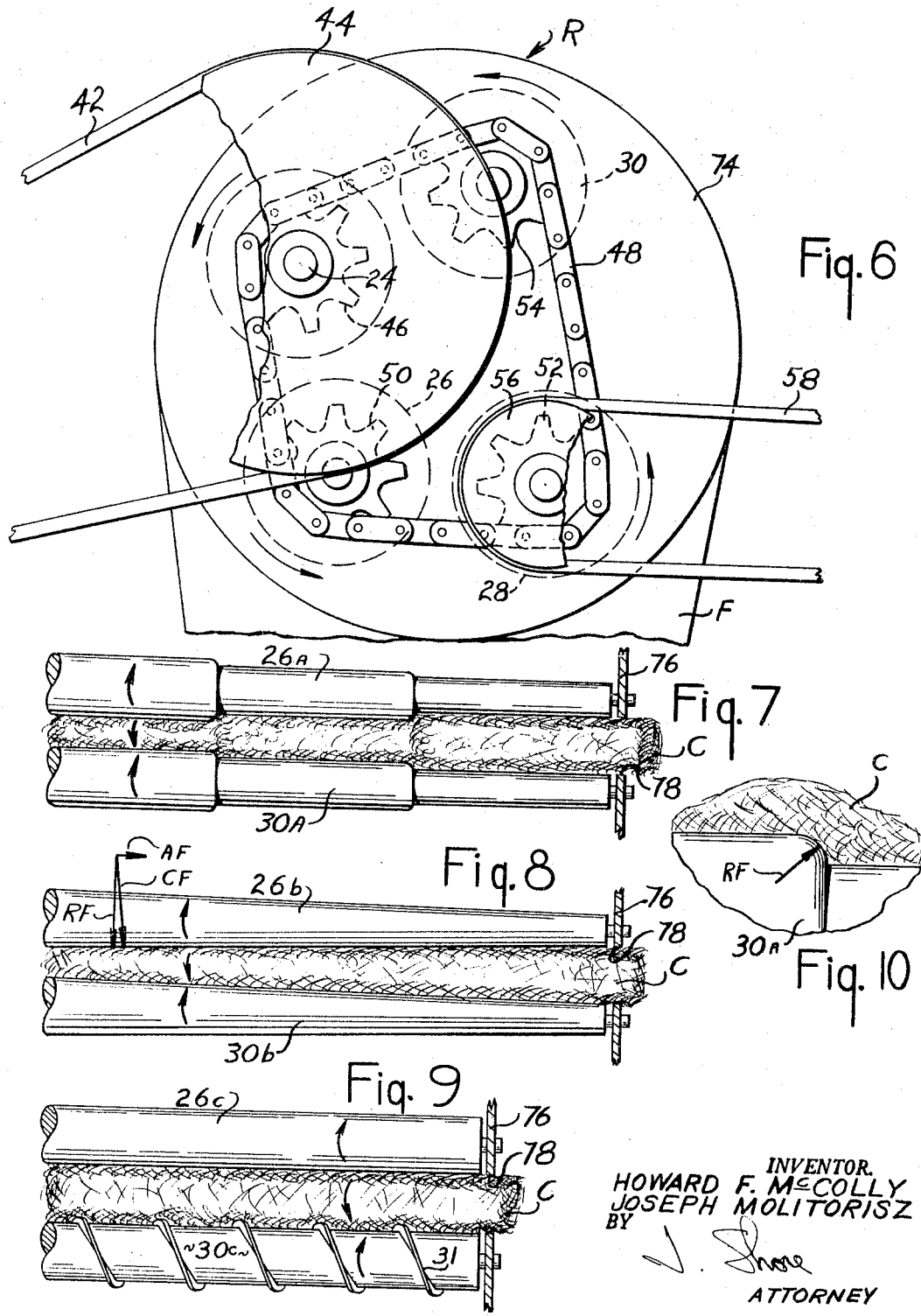

INVENTORS
HOWARD F. McCOLLY
JOSEPH MOLITORISZ
BY: J. Shore
ATTORNEY.

United States Patent Office 3,316,694
Patented May 2, 1967

3,316,694
CROP PELLETER
Howard F. McColly and Joseph Molitorisz, East Lansing, Mich., assignors to Michigan State University
Filed Nov. 8, 1963, Ser. No. 323,198
9 Claims. (Cl. 56—1)

This invention relates to a crop pelleting machine and particularly to a machine for the picking up and forming of forage, plant vines and stems, crop residues, and other materials into compressed form and cutting them into pellets, wafers or other desirable shapes, the present application being a continuation-in-part of the prior application of Howard F. McColly and Joseph Molitorisz, Ser. No. 67,193, filed Nov. 4, 1960, now abandoned.

The conventional way of preserving hay or other roughage crops for storage and eventual feeding to animals is accomplished by baling machines. The bales so formed often weigh in excess of fifty pounds and they are retained in their compressed state by wire or rope. These bales must then be cut up before the compressed material is fed to cows or other farm animals. Packing and storing crops of this type in this manner is largely dependent on the moisture content of the crop and existing weather conditions which limit the time during which baling can be accomplished.

It can be appreciated that the formation of hay or other forage crops into relatively small compact pellets or wafers would substantially reduce the handling, feeding, and storage problems encountered when working with large bales. Pellets, as is well known are cohesive, stable, and self-supporting, and can be conveniently handled during both storage and feeding operations. Furthermore, it would be most desirable if the crops could be harvested and processed in the field under any moisture condition ranging from air dry to fresh cut, thus eliminating the necessity of the farmer having to wait until the cut product reaches a certain moisture content.

Accordingly, it is an object of this invention to provide a crop pelleter which is low in cost and efficient in operation.

A further object is to provide a machine which will produce densely packed pellets that can be easily handled and readily stored for preserving animal feed.

A further object is to provide a pelleter which will gather the material and form it into pellets under variable moisture and weather conditions.

A still further object is to provide a novel pelleter which employs a roller-compressor mechanism to form a uniformly dense pellet.

Other objects and advantages will become apparent from the following description taken in connection with the following drawings in which:

FIG. 6 is an enlarged cross sectional view showing the roller drive mechanism taken along lines 6—6 of FIG. 1;

Figure 1:
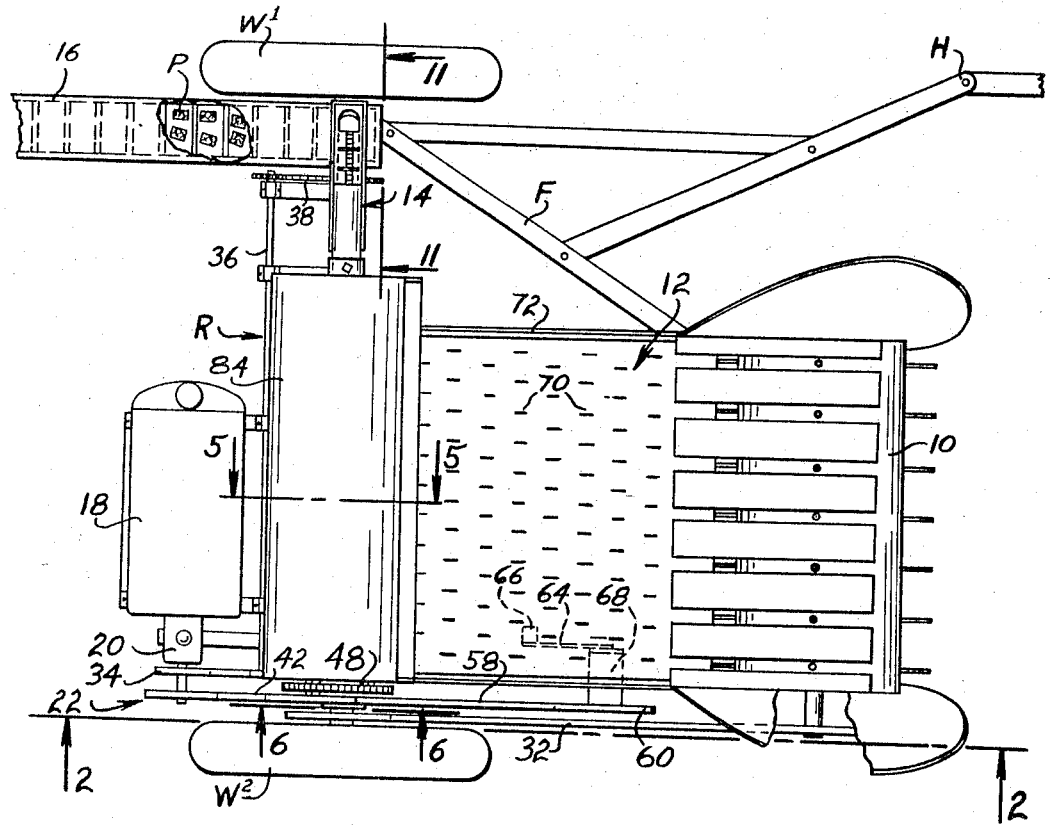
FIG. 1 is a plan view of a field type pellet forming machine.
Figure 11:
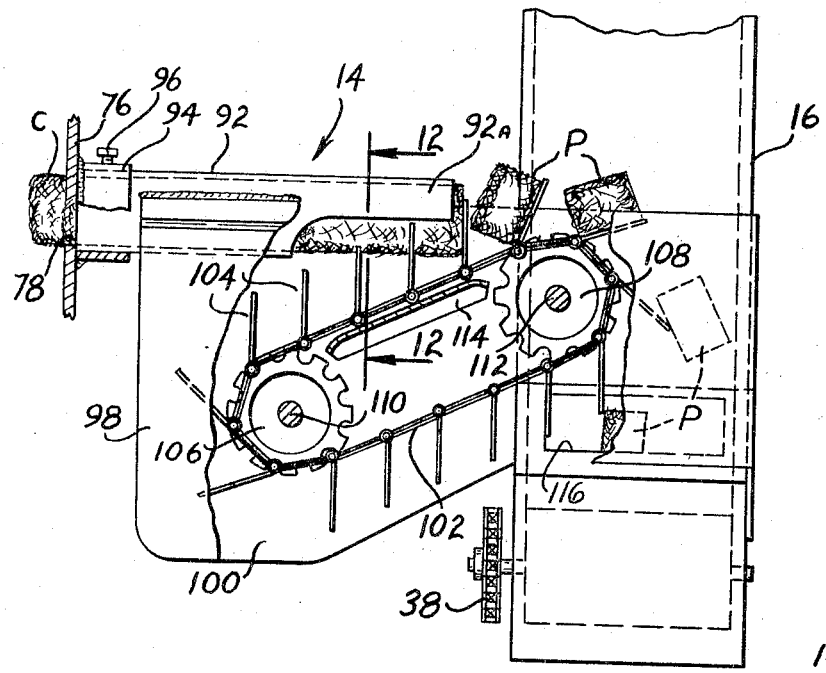
Figure 12:
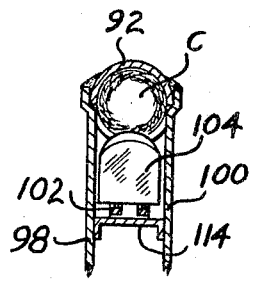
Figure 13:
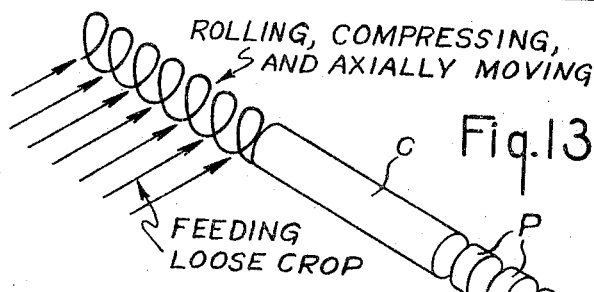
Figure 14:
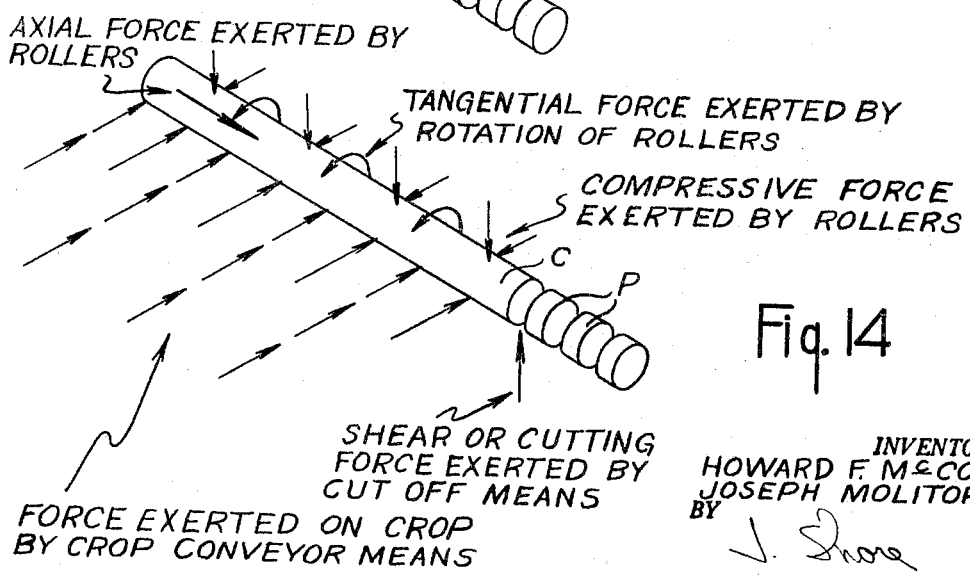
Figure 15:
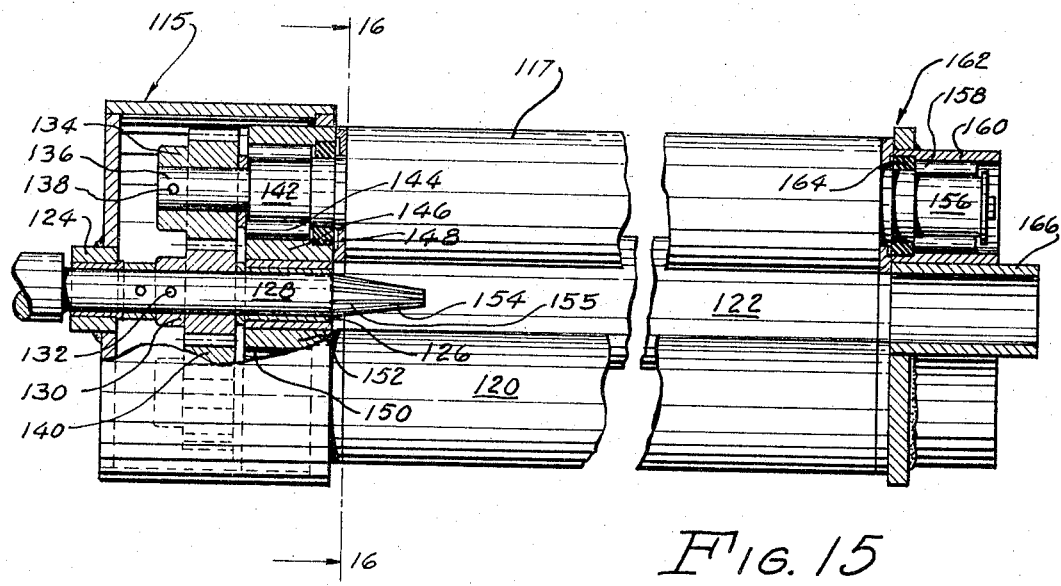
Figure 16:
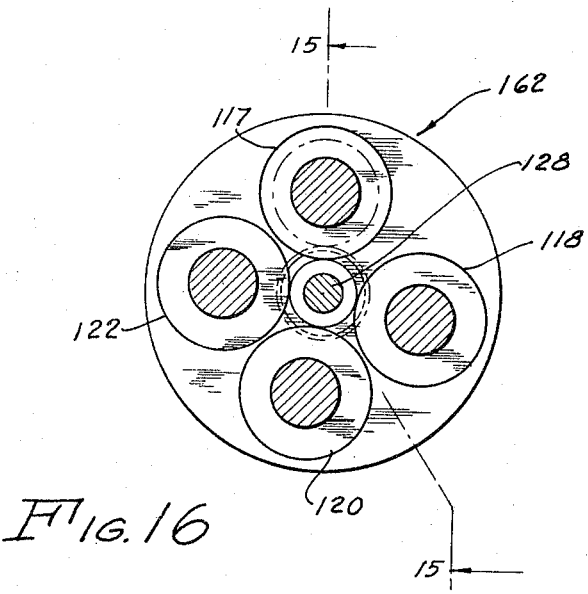

FIGS. 7, 8, and 9 are exaggerated diagrammatic views of various embodiments of the multiple roller-compressor units;

FIG. 10 is an enlarged fragmentary view indicating the forces created in the modification shown in F⁓· ˙ 7;

FIG. 11 is a side view of the cutoff mechanism, enlarged and with parts broken away and taken along lines 11—11 of FIG. 1;

FIG. 12 is a sectional view taken on lines 12—12 of FIG. 11 illustrating the knifing action of the cutoff mechanism;

FIG. 13 is a perspective diagrammatic view of the forming of the pellets;

FIG. 14 is a perspective diagrammatic view of the forces acting on the material during the pellet making operation;

FIG. 15 is a front elevation with parts broken away of a modified form of the invention; and FIG. 16 is a sectional view of the same on the line 16—16 of FIG. 15.

Generally stated, the invention is practiced by providing a pickup and conveyor means for directing crops from the field into a roller-compressor mechanism where the crop is formed into a densely compressed roll which in turn is expelled from the roller-compressor unit to a cutting mechanism which cuts the roll into desirable size pellets or wafers.

Referring to FIG. 1, there is illustrated in plan view a field crop pelleter comprising a frame structure F, which is supported by wheels $W^1$ and $W^2$ mounted on an axle A. The pelleting machine can be drawn by a prime mover such as a tractor (not shown) through a hitch mechanism H. The pelleter consists of a conventional pickup means 10, which picks up the crop from the ground and directs it to a conveyor 12, which in turn feeds the material to a roller-compressor unit R. The roller-compressor unit compresses the material fed thereto into a substantially cylindrical core C, see also FIGS. 3 and 5, which is moved out through the end of the roller-compressor unit where it is cut off by a cutting mechanism 14, and deposited onto an elevator 16, which conveys the pellets P to a wagon or the like.

In the arrangement shown in FIG. 1, there is provided an internal combustion engine 18 mounted on the frame F, which drives through suitable gearing mechanism 20 and belt drive 22, the roller-compressor means R consisting of generally parallel rollers 24, 26, 28, and 30, and the vibrating conveyor 12. The details of this drive mechanism are shown more clearly in FIGS. 2, 3, and 6, which will be described in greater detail hereinafter. The pickup 10 is suitably operated through a conventional belt type drive mechanism 32 driven by the ground wheel $W^2$. Elevator 16 is driven from gear box 20 by a belt drive 34, cross shaft 36 and chain and sprocket drive 38.

Figure 2:
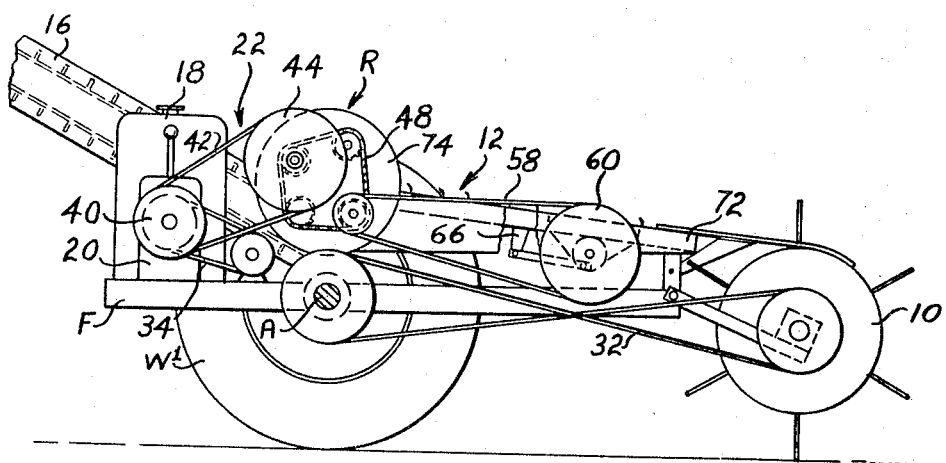
FIG. 2 is a longitudinal section taken along lines 2—2 of FIG. 1.

In the longitudinal sectional view shown in FIG. 2, there can be seen in greater detail the drive mechanism for the roller-compressor unit R and the vibrating conveyor 12. Engine 18 drives the roller-compressor unit R through gearing mechanism 20, pulley 40, belt 42, and pulley 44, which is secured to the end portion of the shaft of roller 24. Also secured to the shaft of roller 24 is a sprocket 46 that drives chain 48, which in turn drives rollers 26, 28, and 30 through sprockets 50, 52, and 54 respectively (see FIG. 6). The sprockets 46, 50, 52, and 54 are identical and the rollers 24, 26, 28, and 30 have substantially the same diameter so that the rollers have relatively the same peripheral speed.

Figure 3:
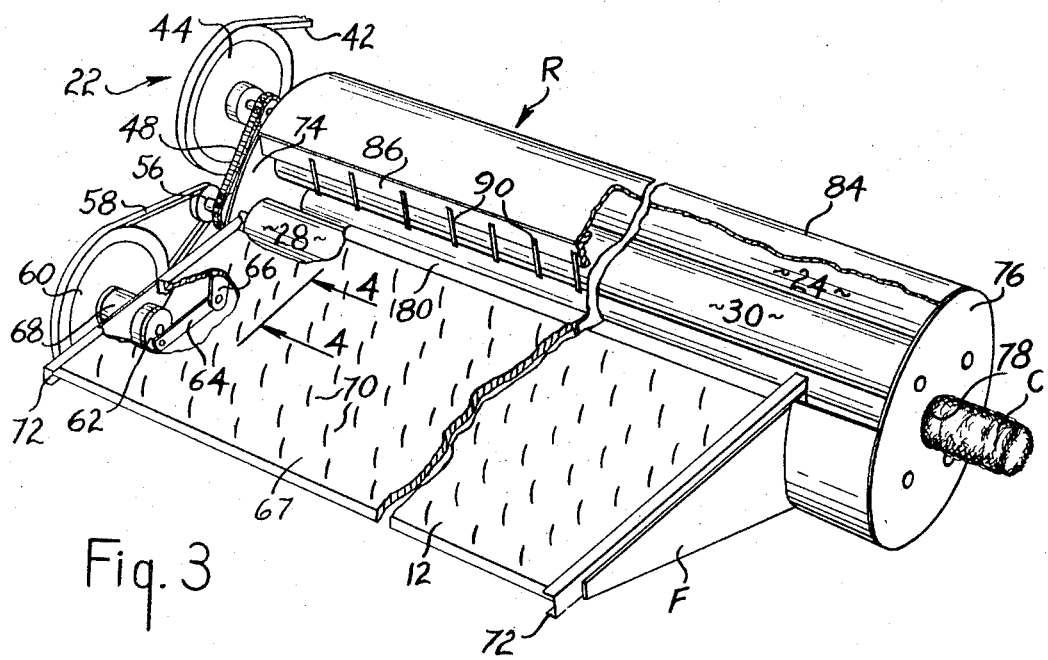
FIG. 3 is an enlarged perspective view of a conveyor means and associated drive mechanism, and a roller-compressor unit.
Figure 4:
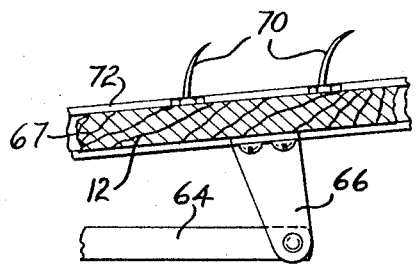
FIG. 4 is an enlarged fragmentary cross sectional view taken along lines 4—4 of FIG. 3.

FIG. 3 illustrates a vibrating conveyor 12 driven from pulley 56, which is secured to the outer end of roller 28, and which drives, through a belt 58 and pulley 60, crank mechanism 62. Crank mechanism 62 includes a connecting link 64 pivotally attached at one end to bracket 66 that is secured to the underside of a conveyor platform or element 67 constituting part of conveyor 12. The opposite end of link 64 is driven by pulley 60, which is supported by bearing member 68 mounted on frame F. The vibrating conveyor 12 has secured to the top of element 67 a plurality of curved spring fingers 70 which upon reciprocation in one direction, catch and propel the material fed thereto by the pickup 10 into the roller mechanism R. Conveyor 12 slides on spaced apart channel members 72 which are suitably affixed to the frame F. Also shown in FIG. 3 are the end plates 74 and 76 affixed to frame F, which support in conventional bearings (not shown) the rollers 24, 26, 28, and 30. End plate 76 is provided with an opening 78 through which the core C is expelled.

Figure 5:
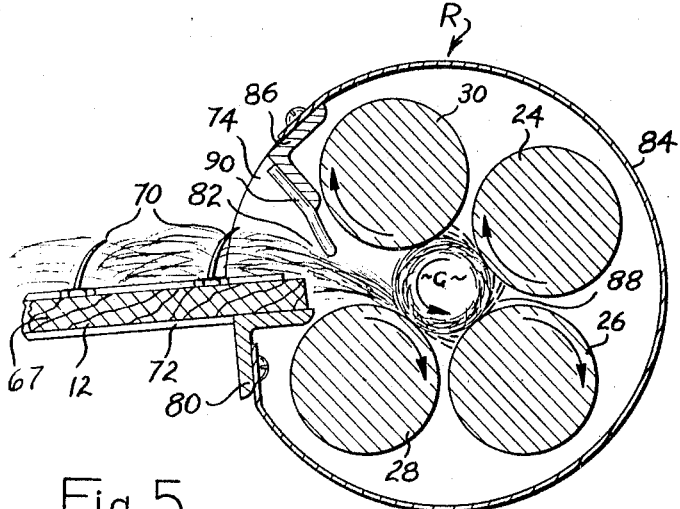
FIG. 5 is an enlarged cross sectional view of one form of the roller-compressor unit taken along lines 5—5 of FIG. 1.

Referring now to FIG. 5, it can be seen that the conveyor 12 deposits the crop onto transverse frame member 80, which aligns the material relative to the entrance 82 of the roller mechanism R. The rollers 24, 26, 28, and 30 are covered by a safety shield or housing 84, secured to transverse frame member 86. The rollers 24, 26, 28, and 30 are mounted between the end plates 74 and 76 generally parallel to each other in a manner to define the core forming chamber 88. Rollers 28 and 30 are spaced apart to define a relatively large crop receiving opening 82. The spaces between rollers 30 and 24, 24 and 26, and 26 and 28 provide sufficient clearance so that the adjacent rollers do not contact each other. The rollers are rotated in the same direction by the previously described roller drive mechanism as illustrated in FIG. 6. Thus, the material fed into chamber 88 is rotated into a substantially cylindrical densely packed core by the continuously revolving outer surfaces of the rollers 24, 26, 28, and 30. The core C is formed in this manner by the contact of the material with the outer surfaces of the rollers, which contact points describe the core forming chamber 88. To prevent any of the material from being deflected out of chamber 88 and to further insure alignment of the material in the feed opening 82, a plurality of downwardly projecting fingers 90 secured to a transverse frame member 86 are provided. Thus, it can be seen by referring to FIG. 5 when the hay or like material, which is in an entangled condition as it is received from the field, is introduced into the roller-compressor mechanism through opening 82, it is directed by roller 28 rotating in a clockwise direction into core chamber 88 by virtue of the surface action of the roller 28 on the crop mass. The material to be compressed, such as hay, is further interwoven by the action of the rollers, which wrap the material to assist in the formation of a densely packed core C. The downwardly projecting fingers 90 direct the crops against roller 28 thereby preventing a reverse action by the moving surface of roller 30, which would tend to push the crop out of the crop opening 82. It is to be noted that one of the essential criteria is that the rollers are all rotated in the same direction. It is desirable that the rollers have the same relative peripheral speeds along their lengths to rotate core C without any substantial slippage occurring between the core and the individual rollers. In this embodiment substantially equal peripheral speeds are accomplished by having identical rollers rotated at the same rate, but it can be appreciated that it is within the scope of this invention to have different diameter rollers rotated in the same direction at other speeds.

The roller mechanism disclosed in FIG. 5 illustrates the fact that the hay or other material introduced into the chamber 88 between the rollers is formed into a core C resulting from the fact that the entwined mass of material is rolled around by the rollers and wrapped to form the core C. With continuous introduction of material into the chamber 88, the density of the core C will increase until the compressive forces between the core and the rollers are great enough to create an axial force by one or more of the rollers which will tend to move the core C out of chamber 88 through opening 78 in the end plate 76. Thus the forces tending to expel the core C from the chamber 88 will increase as the density of the core C increases. This axial movement of the core can be accomplished in many ways, for example, by forming the rollers as illustrated in one of the embodiments shown in FIGS. 7, 8, and 9. It should be noted at this time that the density of the core C will vary with the compressibility of the type of material being rolled.

FIGS. 7, 8, and 9 are exaggerated diagrammatic representations showing only two of the total number of rollers in the compressor unit. FIG. 7 illustrates a roller-compressor unit assembly in which the rollers 30a, 26a have generally parallel axes with one or more different diameter portions and having rounded shoulders at their intersections. The rounded shoulder portions thus provided on the rollers present surfaces which are non-parallel to the axis of the core being formed and consequently the forces exerted by the compressed core C at such non-parallel surfaces result in a reactive force RF which is at an angle to the axis of the core C. This reactive force RF has both radial and axial components and the axial component is effective to expel the core C through the chamber discharge opening 78. The drawing (FIG. 10) has been exaggerated for ease of representation of the forces present. Actually the shoulder portions are relatively shallow and thus the peripheral speeds along the length of the rollers will vary according to the change in diameters, but this variation is minimal. The spacing between the surfaces of the adjacent rollers is not materially changed, and the rollers can be said to be generally parallel in view of the fact that their axes are parallel and the diametric variation is slight.

In FIG. 8 the axes of the rollers 30b, 26b are parallel and the rollers are slightly tapered so that the core C is formed with a slight taper. By way of example only, the rollers could have a ratio between the diameter of the large end and the length of the rollers of ten to one. With this ratio a taper along the length of the rollers of between three to five degrees would be in order. It is to be understood that in this embodiment the peripheral speed along the length of the rollers will vary but this differential is minimal and merely results in a minor twisting effect on the core C. These rollers could be said to extend in a substantially common direction. As seen in FIG. 8, the taper has been greatly exaggerated in order that the forces reacting on the core C can be illustrated. The compressive force CF exerted on the core C by the forming rollers is applied normal to the surface of the core C and at an angle to the axis of the core C due to its taper and can be resolved into two components, a radial force RF and an axial force AF. The axial force AF applied on the core C due to the compressive force CF of the rollers on the core will continually expel the material from the core forming chamber as more material is fed into the core forming chamber. It can be appreciated that the axial force AF must be great enough to exceed the frictional drag of the roller surfaces against the core before the core will move out through opening 78 in the end plate 76. Accordingly, the density of the core can be varied by changing the taper of the rollers, which in turn will vary the axial force AF and will result in either speeding up or slowing down the expelling of the core from the core forming chamber.

In FIG. 9 there are shown cylindrical rollers 30c, 26c having parallel axes, and on at least one of the rollers, as for example 30c, there is formed a helical ridge 31, which functions as a transport device to move the compressed core C out through opening 78 in the end plate 76. By continually feeding material into the rollers the density of the compressed material increases, and after becoming sufficiently dense the compressed material will be acted upon by the helical ridge 31 which exerts an axial force due to the difference in peripheral speed between the core and the helical ridge to move the material out of the core forming chamber. The height of this helical ridge 31 is of such a dimension that it will provide the desired difference in peripheral speeds, yet it is not high enough to interfere with the rotation of the adjacent rollers.

Referring now to FIGS. 11 and 12, there is illustrated the cutting mechanism 14 which severs the core C into pellets P, which are in turn dropped into the elevator 16 and directed to a wagon or other receiving receptacle. The core C as it extends out of opening 78 is retained against deflection during the cutting operation by a tubular member 92, which is suitably affixed to end plate 76 by collar 94 and set screw 96. A portion of tubular member 92 is removed to allow the core C to be cut in a manner hereinafter described. Side sheets 98 and 100 are secured to member 92 to support the cutoff mechanism 14 which is actuated by the axial movement of the core C. The cutoff mechanism 14 includes an endless chain 102 having its upper run inclined upwardly or toward tubular member 92 and on which is mounted a plurality of cutting blades 104. The blades 104 are suitably mounted so as to facilitate their passage around the ends of the path of chain 102 which is defined by sprockets 106, 108 rotatably mounted on shafts 110, 112, respectively, and so as to hold the blades 104 in a fixed, vertical position as they move along the upwardly inclined upper run of the chain. Shafts 110, 112 are rotatably suported by conventional bearings (not shown) on side sheets 98, 100. Chain 102 is braced during the cutting operation by support 114 secured between the side sheets 98 and 100.

The aforementioned cutting mechanism severs the pellets P from the core in the following manner:

As shown in FIG. 11, as the core is expelled from the chamber 88 through the tubular member 92 it contacts and pushes the facing surface of one of the blades 104, and the pressure of the axially moving core on such blade, and on succeeding blades contacted by the core C, serves to drive chain 102 about sprockets 106, 108. Due to the angular relationship of the cutting mechanism 14 relative to the core C, this initial engagement of the core with one of the blades 104 causes subsequent blades to come in contact with the core C in a spaced relationship to sequentially form the desired size pellets. The rotation of the cutting mechanism thus driven by the axial movement of the core causes the knives to cut the core into pellets along a plane normal to the axis of the core. The underside of end portion 92a of the tubular member 92 is cut away to allow the knives to cut the core while the core is supported against upward deflection by the upper portion of 92a. This cutting action is further enhanced by the rotation of the core, which rotation results in relative motion between the core and the knife in the direction lengthwise of the cutting edge of the knife, analogous to the well-known "drawing" effect known to be effective in the operation of cutting apparatus. After the pellets are severed from the core they are carried by knives 104 and deposited into opening 116 in the upper surface of elevator 16. It will be noted that the side plates 98, 100 are so formed as to enclose the opening 116 to insure positive placement of the pellets P into the elevator mechanism.

Referring now to FIGS. 13 and 14, there is shown a diagrammatic view of the forming of the pellets and the forces acting on the material during the pellet making operation.

*Method of operation*

The crop pelleter disclosed in this application is a field machine which picks up the crops which are normally in the form of an entwined mass of stems and leaves and directs this material to a conveyor from where it is fed into a forming chamber located between a plurality of rollers rotating in the same direction and at the same speed. The material directed into this chamber is wrapped into a substantially cylindrical mass which further entwines and locks the fibers into a dense core. The core is continuously rotated in the forming chamber by the rollers and remains therein until a predetermined density is reached. When the desired density is reached, the rollers will react with an axial force to gradually expel the core from the forming chamber. This results from the fact that as the crop material is continuously introduced into the chamber it wraps around the core and continuously builds the core density to a point where the compressive forces are built up where the material behaves in a manner analogous to a plastic or liquid. In the case of the tapered and stepped rollers the axial component of the compressive force is large enough to expel the core from the core forming chamber by reaction against the tapered or stepped surfaces, and in the case of the roller having the helical ridge the expulsion takes place when the core is sufficiently dense to enable the ridge to transport the core out of the chamber. When the core leaves the core forming chamber it is cut into pellets by the cutting mechanism. The pellets are then directed to an elevator which transports the pellets to a wagon or other receiving receptacle. It is noted that during start up of the machine it may be necessary to prime the core forming chamber to insure proper formation of the core. With this type of pelleting machine it can be appreciated that any excess moisture in the crop will be squeezed out during processing and the moisture will have no appreciable effect on the function of the machine.

It can be appreciated that a number of modified forms have been disclosed, but it is by no means intended that the invention be limited to the embodiments disclosed in the drawings. For example, it can be understood that other types of conveyor mechanism for directing the material to the roller-compressor means could be employed as, for example, a continuously running belt type conveyor, or other types which could be selected by one skilled in the art. Furthermore, the invention is not limited to a four roller compressor mechanism since if it is desired to make larger or smaller diameter pellets, the diameter and/or the number of rollers employed in the roller-compressor unit could be changed. Also, smooth cylindrical rollers having parallel axes could be used to compress the crop as hereinbefore suggested. In this form of the invention the material would be built up to the prescribed density and then as more material is added the core would be forced or extruded toward the opening 78 in the end plate 76. Furthermore, if it is desired to forcibly push the core out of the chamber, an auxiliary device such as an oscillating stuffer could be used. This would be a short stroke device which would offer a vibrating or alternating pushing action on the core of material, tending to move it toward the exit end of the core chamber.

Another modification which is within the scope of this invention is that this unit could be modified to expel the compressed material from both ends of the roller-compressor unit merely by duplicating the mechanism on both sides of a transverse center line. For example, the modification shown in FIG. 8 could be duplicated by putting a tapered set of rollers in the other direction which would result in the material being fed out both ends of the rollers. Also, other cutting means such as power actuated swinging knives could be employed. It can be appreciated that other types of drive mechanism can be used; for example, sun and planet type gearing could be utilized to drive the core forming rollers in the manner shown in FIG. 15. Also, this crop compressing mechanism does not necessarily have to be embodied in a field machine of the type disclosed, but it could be employed in a stationary processing mill, or other varieties of field machines such as self-propelled machines. Furthermore, the crop compressing machine does not necessarily have to be used for processing forage crops, but it could be incorporated in a machine which forms any fibrous materials into a compact cylindrical roll; for example, machines used to compress wood fibers and shavings into simulated "logs" for fireplace use. This machine could also be used to form a continuous rope-like core which could be coiled or cut into any desired length.

A further modification which is contemplated would include an end support 115 for the rollers 117, 118, 120, and 122, FIGS. 15 and 16, and which carries in a bearing 124 and a bushing 126, a driving shaft 128. Shaft 128 has a pinion or gear 130 fixed thereon as by a pin 132 and driving a gear 134 fixed on a shank portion 136 of roller 117 as by a pin 138 so that rotation of shaft 128 will cause opposite rotation of roller 117 at a rate that is proportional to that of shaft 128. Gear 130 also meshes with and drives a gear 140 fixed on a shank portion of roller 120. In similar manner, shaft 128 drives rollers 118 and 122 so that fibrous material may be rolled between them in the manner hereinbefore described in connection with FIGS. 1 to 5 inclusive. Shank portion 136 has a race portion 142 supported by bearing rollers 144 running in a race 146 strongly supported in support 115, and an oil seal 148 of suitable type is interposed between rollers 144 and roller 116 to prevent any possible contamination by oil from the bearing rollers, of the material being treated.

Rollers 120, 118 and 122 are similarly supported on bearings as 150 carried in races as 152, and shaft 128 extends between the races and has a portion 154 projecting a short distance into the space between the rollers, and which is preferably frusto-conical in shape. Portion 154 is preferably provided with a roughened surface, as by forming thereon a plurality of grooves and splines 155. Rotation of shaft 128 starts the rotation of the material at the end adjacent portion 154 and provides a positive drive for a portion of the hay mass, reducing the probability of slippage in rotational motion.

The opposite end of roller 116 has a race portion 156 supported by bearing rollers 158 in a race portion 160 strongly supported in an end support 162, and an oil seal 164 is interposed between rollers 158 and roller 117 to prevent contamination of the treated material by oil from the bearing. Rollers 118, 120 and 122 are preferably similarly supported at their ends remote from support 115. Support 162 in the present instance has a collar or sleeve 166 through which the core of fibrous material is delivered when sufficiently compacted by the rollers 117, 118, 120 and 122.

In the operation of this embodiment, it is to be noted that the conical or frusto-conical portion 154 of the shaft 128 rotates in a direction opposite to that of the rollers which it drives; or in other words, in the same direction as the core of material forming in the space between the rollers, and it is the intention that the rate of rotation of the shaft 128 should be equivalent to that of the core of material. To accomplish this, the pitch line of the gear 130 is made of a diameter comparable to the nominal diameter of the core forming chamber, and which may be the diameter of the theoretical space between the rollers, but it may vary somewhat therefrom according to the amount of slippage contemplated between the rollers and the core of material. Thus, if, for example, considerations indicate that considerable slippage may be anticipated, the core will rotate somewhat slower than would be expected by a consideration of the theoretical diameter of the core as compared with that of the rollers, and the pitch line or pitch circle may be chosen a little larger than the theoretical diameter of the core chamber, so that the shaft will not be found to run appreciably faster than the core, and which is true of the embodiment shown in FIG. 15. On the other hand, the positive rotation of the shaft will tend to cause prompt starting of a rotating core by reason of the positive rotation imparted to the incoming material by the rotating shaft.

Other equivalents will occur to those skilled in the art, and it is of course intended to cover by the appended claims all such modifications as fall within the true spirit and scope of the invention.

What is claimed is:

1. In a machine for pelleting forage crop material including a frame, a pair of spaced end supports on the frame, a plurality of compressing rollers extending substantially in a common direction between said end supports and rotatably supported by said end supports, said rollers being spaced from each other to define therebetween a central core-forming chamber, two of said rollers being spaced from each other circumferentially of said core-forming chamber to form a feeding opening leading into said core-forming chamber, conveyor means leading into said feeding opening and having a portion movable to propel crop material, and so disposed as to project a sheet of crop material through said feeding opening into said central core-forming chamber, means for rotating said rollers in the same direction and actuating said movable conveyor portion, and at least one of said end supports providing an exit opening axially of said core-forming chamber through which a core formed in said chamber may be expelled from said chamber and said compressing device, said rollers being tapered in the direction of said exit opening.

2. In an agricultural machine of the character described comprising a mobile frame adapted to advance over a field of crops such as hay and the like; the combination of a movable crop gathering and feeding means supported by the frame for collecting the crops from the field, a roller-compressor means supported by the frame and including a plurality of rollers having parallel axes which are arranged to define a generally cylindrical core forming chamber, two of said rollers being spaced from each other to form a feeding opening, means for driving the rollers in the same direction and at a rate so their peripheral speeds are substantially equal, said crop gathering and feeding means being so positioned as to feed crop material through said feeding opening into said core-forming chamber, means for driving said movable means, said frame defining an opening through which the core is directed by said roller-compressor means, and cut-off means secured to the frame adjacent the last-mentioned opening for cutting into pellets the core defined and expelled by the rollers from the roller chamber.

3. An agricultural machine of the type disclosed in claim 2 in which the rollers of the roller-compressor means include at least one roller defining a spiral ridge, which assists in the expelling of the core from the core chamber.

4. An agricultural machine of the type disclosed in claim 2 in which at least one of the rollers defines slightly reduced diameter portions in the direction of said frame opening.

5. A machine for pelleting crop material comprising a frame, a pair of spaced end supports on the frame, a plurality of compressing rollers extending substantially in a common direction between said end supports and rotatably supported from said end supports, said rollers being arranged circumferentially and spaced from each other only sufficiently to define therebetween a central core-forming chamber of an effective diameter at least as small as said rollers, two of said rollers being spaced from each other circumferentially of said core-forming chamber to form a feeding opening leading into one side of said core-forming chamber, means for rotating said rollers in the same direction and said rollers being spaced so as to form crop material fed into said chamber opening into a generally cylindrical core of crop material within said chamber, at least one of said end supports providing an opening axially of said chamber through which the core is expelled, and cutoff mechanism disposed adjacent said end support opening which mechanism is responsive to axial movement of the core through said opening to be impelled thereby into said core to transversely slice the expelled core into pellets of predetermined length.

6. A machine for pelleting crop material comprising a frame, a pair of spaced end supports on the frame, a plurality of compressing rollers extending substantially parallel to each other between said end supports and rotatably supported from said end supports, said rollers being spaced from each other only sufficiently to define therebetween a central core forming chamber of a diameter at least as small as one of said rollers, two of said rollers being spaced from each other circumferentially of said core-forming chamber to form a feeding opening leading into one side of said core-forming chamber, one of said end supports providing an opening axially of said core-forming chamber through which a core of crop material formed in said chamber may be expelled from said chamber, means for rotating said rollers at substantially the same peripheral speed and in the same direction so as to feed the incoming crop material into the chamber and then roll the material into a generally cylindrical core, and cutoff mechanism disposed adjacent said end support opening and comprising an endless conveyor, a plurality of knives mounted in spaced-apart relation along said endless conveyor, said conveyor being disposed generally lengthwise of the path of movement of the core as it leaves said chamber and having a straight run inclined toward the path of movement of the core, said knives projecting from said straight run of said conveyor and being movable therewith to sequentially engage the moving core and slice transversely therethrough, said conveyor being movable in response to the axial thrust provided by the core of crop material as it moves out of said chamber and engages the facing surfaces of said knives.

7. In a machine for pelleting forage crop material, a compressing device comprising a main frame including end supports, a plurality of compressing rollers rotatably supported by said end supports and extending generally in a common direction, said rollers being circumferentially arranged and spaced from each other to define therebetween a core forming chamber, one of said end supports providing a substantially closed end for said chamber and the other of said end supports providing an opening axially of said core-forming chamber, two of said rollers being additionally spaced from each other to form a feeding opening leading into said core-forming chamber, means for rotating said rollers in a common direction whereby one of said rollers bounding said feeding opening will have a surface portion moving from said core-forming chamber outwardly through said feeding opening, a conveyor leading to said feeding opening and disposed to propel crop material into said feeding opening, means secured to said frame in said feeding opening positioned to be encountered by said crop material to prevent such material from coming into contact with said outwardly moving surface portion, and cutoff means secured to said frame adjacent the opening defined by said end support to cut the core, directed out of said core-forming chamber by the rollers, into pellets.

8. In crop pelleter the combination of a frame, including a housing having spaced end supports, a plurality of substantially parallel rollers journaled at their ends in said end supports in generally fixed circumferentially arranged relation such as to define between them a core-forming chamber, two of said rollers being spaced from each other to define a crop receiving opening, means for introducing crops into contact with the surfaces of said rollers within said core-forming chamber, means for driving said rollers in a common direction to effect wrapping of the crop into a core by said rollers, one of said end supports providing an opening aligned with said core-forming chamber, through which a core of crop material formed in said chamber may be expelled.

9. In an agricultural machine of the character described comprising a mobile frame adapted to advance over a field of crops such as hay and the like; the combination of a movable gathering and feeding means supported by the frame for collecting the crops from the field, a roller-compressor means supported by the frame and including a plurality of identical substantially parallel rollers, said rollers being arranged to define a core-forming chamber therebetween of an effective diameter at least as small as that of said rollers, means for driving the rollers in the same direction and at the same speed so that the peripheral speeds of adjacent points on the rollers are substantially equal, and cutoff means for cutting into pellets the core defined and expelled from the chamber by the rollers.

References Cited by the Examiner

UNITED STATES PATENTS

| | | | |
|---|---|---|---|
| 184,244 | 11/1876 | Hutchings | 198—223 |
| 378,570 | 2/1888 | Brady | 100—89 |
| 642,099 | 1/1900 | Faulkner | 100—89 |
| 799,175 | 9/1905 | Luebben et al. | 100—88 X |
| 961,997 | 1/1910 | Ball et al. | 100—89 X |
| 963,775 | 7/1910 | Killman | 100—78 X |
| 983,086 | 1/1911 | Reagan | 100—86 X |
| 1,221,594 | 4/1917 | Richman | 25—110 |
| 1,501,455 | 7/1924 | Ingersoll. | |
| 1,510,885 | 10/1924 | Dunlap | 100—89 |
| 2,367,911 | 1/1945 | Wells. | |
| 2,612,852 | 10/1952 | Morrison | 146—87 X |
| 2,893,308 | 7/1959 | Bodisch | 100—86 X |

LOUIS O. MAASSEL, *Primary Examiner.*

WALTER A. SCHEEL, *Examiner.*